US012064916B2

(12) United States Patent
Brandenburger et al.

(10) Patent No.: US 12,064,916 B2
(45) Date of Patent: Aug. 20, 2024

(54) AMPOULE FILLED WITH A MEDICAL LIQUID AND METHOD FOR PRODUCING SAME AND SYSTEM USED THEREFOR

(71) Applicant: Fresenius Kabi Deutschland GmbH, Bad Homburg (DE)

(72) Inventors: Torsten Brandenburger, Friedberg (DE); Andreas Pfeffer, Friedberg (DE)

(73) Assignee: Fresenius Kabi Deutschland GmbH, Bad Homburg (DE)

( * ) Notice: Subject to any disclaimer, the term of this patent is extended or adjusted under 35 U.S.C. 154(b) by 184 days.

(21) Appl. No.: 17/609,633

(22) PCT Filed: Jul. 2, 2020

(86) PCT No.: PCT/EP2020/068722
§ 371 (c)(1),
(2) Date: Nov. 8, 2021

(87) PCT Pub. No.: WO2021/004902
PCT Pub. Date: Jan. 14, 2021

(65) Prior Publication Data
US 2022/0219376 A1    Jul. 14, 2022

(30) Foreign Application Priority Data
Jul. 5, 2019  (EP) ................................. 19184626

(51) Int. Cl.
*B29C 49/64* (2006.01)
*A61J 1/06* (2006.01)
(Continued)

(52) U.S. Cl.
CPC ........... *B29C 49/6445* (2013.01); *A61J 1/067* (2013.01); *A61J 1/1418* (2015.05); *A61J 1/1431* (2015.05);
(Continued)

(58) Field of Classification Search
CPC ............ B29C 49/421; B29C 49/42119; B29C 49/42065; B29C 49/42085;
(Continued)

(56) References Cited

U.S. PATENT DOCUMENTS

| 5,620,650 A * | 4/1997 | Nakajima ............... B29C 49/42 264/520 |
| 2005/0046085 A1 * | 3/2005 | Voth .................... B29C 49/6436 425/526 |
| 2014/0131920 A1 | 5/2014 | Nakahara |

FOREIGN PATENT DOCUMENTS

| EP | 1688234 A2 * | 8/2006 | ......... B29C 49/4802 |
| JP | H04275130 A | 9/1992 | |

(Continued)

OTHER PUBLICATIONS

Mechanical translation of WO 2015007703A1 dated Jan. 2015. (Year: 2015).*
(Continued)

*Primary Examiner* — Robert B Davis
(74) *Attorney, Agent, or Firm* — Occhiuti & Rohlicek LLP

(57) ABSTRACT

Disclosed is a method and a system for producing an ampoule filled with a medical liquid. A preform is produced by plastic injection moulding that is then inhomogeneously heated and blown to form an ampoule body. Further disclosed is an ampoule produced by means of stretching and blowing, which comprises a connector with a break-off part in which the predetermined breaking point is aligned with the septum of the connector.

15 Claims, 10 Drawing Sheets

(51) Int. Cl.
*A61J 1/14* (2023.01)
*B29C 49/06* (2006.01)
*B29C 49/42* (2006.01)
*B29L 31/00* (2006.01)

(52) U.S. Cl.
CPC .......... *B29C 49/06* (2013.01); *B29C 49/6427* (2013.01); *B29C 2793/0027* (2013.01); *B29C 2793/009* (2013.01); *B29L 2031/712* (2013.01)

(58) Field of Classification Search
CPC .............. B29C 49/6436; B29C 49/645; B29C 49/6458; B29C 49/6435; B29C 49/6427; B29C 49/6418; B29C 49/6419; B29C 49/64

See application file for complete search history.

(56) References Cited

FOREIGN PATENT DOCUMENTS

| | | | | | |
|---|---|---|---|---|---|
| JP | 2000043128 | A | * | 2/2000 | |
| WO | WO-2005037647 | A1 | * | 4/2005 | ............. B65B 3/022 |
| WO | 2008110887 | A2 | | 9/2008 | |
| WO | 2015007703 | A1 | | 1/2015 | |
| WO | WO-2015007703 | A1 | * | 1/2015 | .............. A61J 1/067 |

OTHER PUBLICATIONS

Mechanical translation of WO 2005037647 A1 dated Apr. 2005. (Year: 2005).*

Mechanical translation of JP 2000-043128 A dated Feb. 2000. (Year: 2000).*

\* cited by examiner

AMPOULE FILLED WITH A MEDICAL LIQUID AND METHOD FOR PRODUCING SAME AND SYSTEM USED THEREFOR

CROSS-REFERENCE TO RELATED APPLICATIONS

This application is a national phase under 35 U.S.C. 371 of International Application No. PCT/EP2020/068722 filed on Jul. 2, 2020, which claims priority to European Application No. 19184626.0 filed on Jul. 5, 2019, the contents of all of which are hereby incorporated by reference in their entireties.

FIELD OF THE INVENTION

The invention relates to a method for producing an ampoule filled with a medical liquid. The invention further relates to such an ampoule and a system for producing an ampoule filled with a medical liquid.

BACKGROUND OF THE INVENTION

The published patent application WO 2015/007703 A1 (Fresenius Kabi Deutschland GmbH) shows an ampoule filled with a medical liquid and a method for producing same.

According to the teaching of this document, an ampoule constructed in particular in multiple parts is produced in an injection molding process. Complex and exact geometries, in particular in the region of the head of the ampoule and the base, can also be produced by means injection molding.

In particular, an ampoule with a head to attach a connector and/or with a base can be produced, which forms a standing surface.

The production of the ampoule body by means of an injection molding process is, however, complicated, requires a relatively large tool and also requires, in the case of an ampoule constructed in multiple parts, the joining of individual parts.

A common method known from practice for producing ampoules made of plastic is the blow-fill-seal method, in which a plastic profile is first extruded from an extruder. The extruded plastic profile is blown in a blow mold into a bottle shape and shaped by means of a tool in order to form a base. Then, the ampoule being produced is filled and also shaped by a tool to seal the ampoule.

Using such a method, complex and exact geometries can, however, only be implemented with difficulty. Thus, it is in particular hardly possible to provide the ampoule body with a head which is formed for the connection for what is known as a connector.

Such a connector comprises a septum which can be penetrated by a needle or a spike in order to withdraw the content of the ampoule. Such connectors are generally provided with a break-off part under which the sterile septum is arranged.

The closure used for this purpose is dipped onto the head of the ampoule body. A high dimensional accuracy of the head of the ampoule body is therefore required.

This applies in particular if the top surface of the septum is supposed to be at a height with the top surface of the adjoining closure. Thus, the predetermined breaking point of the break-off part is spaced in its height from the septum in the case of the prior art described at the outset. In this way, shape tolerances, such as for example which may exist when joining the individual components of the ampoule body, can also be balanced out.

Due to regulatory requirements, it may, however, be necessary to configure the septum of the ampoule to be wipeable. Such a configuration is associated with even higher requirements for the dimensional accuracy of the head of the ampoule body.

OBJECT OF THE INVENTION

The object underlying the invention, with respect to the prior art, is to provide a method for producing an ampoule and a system used for this purpose, with which ampoule(s) made of plastic can be easily and efficiently produced with a high dimensional accuracy. The simple production of an ampoule with a standing surface in the base region and a head for accommodating a connector should, in particular, be provided. The object further underlying the invention is to provide an ampoule which is easy to handle and flexible to use.

SUMMARY OF THE INVENTION

The object of the invention is already achieved by a method for producing an ampoule filled with a medical liquid, by an ampoule filled with a medical liquid and by a system for producing an ampoule filled with a medical liquid according to one of the independent claims.

Preferred embodiments and further developments of the invention can be inferred from the subject matter of the dependent claims, the description and the drawings.

The invention relates to a method for producing an ampoule filled with a medical liquid, with a preform being produced by a plastic injection molding process, which is reshaped to form an ampoule by heating and blowing, which comprises a longitudinal side and a narrow side in the cross-section, with the preform being heated prior to reshaping by blowing in such manner that it is heated more strongly in a region of the side wall, which is reshaped to form a region of the side wall of the longitudinal side of the ampoule, than in an adjoining side wall region of the narrow side.

The preform is preferably stretched in this process in its main extension direction and also transversely to its main extension direction in order to be reshaped to form the ampoule.

The preform is preferably blown in order to shape the ampoule by the stretched walls of the preform coming to rest on the walls of a mold by way of which the shape of the ampoule body is defined at least in sections.

The knowledge underlying the invention is that the preform can generate a dimensionally-accurate geometry, in particular in the region of a head of the ampoule, by plastic injection molding.

The preform is then reshaped to form an ampoule by heating, stretching and blowing, in particular the ampoule body is expanded, with exception of the head, into its final shape.

An ampoule is understood as a container within the meaning of the invention, in which a single dose of a medical liquid and/or an active ingredient, e.g. eye drops, is located. In particular, the capacity of such an ampoule is below 50 ml. According to one embodiment, the ampoule is filled with a liquid quantity of 5 ml to 20 ml.

According to the invention, an ampoule is produced, which or whose body, when viewed in the cross-section, comprises a longitudinal side and a narrow side. In particular, the ampoule has an oval cross-section by way of which a short side wall and a long side wall is defined, which merge into one another to form an edge.

The preform, which has, in particular at least in sections, a ring-shaped cross-section, is reshaped to form the ampoule body.

Reshaping is carried out preferably solely by blowing the heated preform. The body of the preform is thus expanded by means of a gas, in particular air, to form the ampoule body.

Prior to reshaping by blowing, the preform is heated according to the invention in such manner that it is heated more strongly in a region of the side wall, which is reshaped to form a region of the side wall of the longitudinal side of the ampoule, than an adjoining region of the side wall, which is reshaped to form a region of the narrow side.

According to the invention, the region of the preform, which is reshaped to form the longitudinal side and which consequently first comes into contact with the mold of the tool, is thus hotter prior to further processing. The preform is thus heated inhomogeneously around its circumference. In particular, two sections are located opposite one another, which are hotter compared to the side wall located therebetween and are reshaped by blowing to form the longitudinal side.

This allows a more even wall thickness of the ampoule body to be achieved compared to a homogeneous temperature of the preform. In the regions of the longitudinal side, which come into contact with the wall of the tool first, the plastic material is hotter. The wall in these regions is stretched more strongly at the start of the blowing operation such that it ideally has roughly the same wall thickness after expanding as the middle of the side wall of the narrow side, which has the widest distance after reshaping when viewed from a central axis of the ampoule body.

According to a preferred embodiment of the invention, the preform is heated by hot air, in particular with a hot air blower.

According to a further embodiment, the preform is heated by means of infrared radiation. Heating by means of infrared radiation can also be combined with heating by means of hot air.

Hot air can targetedly flow into regions of the side wall of the preform in order to heat them more strongly than adjoining regions of the side wall which will be reshaped to form the narrow side.

The preform is in particular heated by introducing it into a nozzle of a hot air blower.

According to a preferred embodiment of the invention, a nozzle is used which has a perforated insert formed in particular as a sleeve, with the perforation being formed to varying extents around the circumference of the insert.

The insert comprises in particular a side wall, with a first region of the side wall having a perforation with a larger open area than a second region of the side wall. In particular, an insert can be used in which only the first region of the side wall has a perforation and in which the side wall is closed in the second region.

Via the insert, openings, which vary in amount and/or distribution and/or size, allow a first region, reshaped into a longitudinal side, to be heated more strongly than a second region.

In particular, two opposing first regions are provided.

These first regions extend in particular into two perforated and opposing rows axially along the side wall of the insert.

Via the opposing rows of openings, hot air flows into the regions of the side wall of the preform, which are reshaped to form the longitudinal side.

The use of such an insert makes it possible to easily carry out the method with particularly good reproducibility of the desired temperature.

The insert can in particular have a front collar, in particular a collar which has a perforation.

When inserted into the nozzle, the hot air flows along the outer wall of the insert and leaves the nozzle via the perforation of the collar.

A part of the air flowing past flows inwards through the perforation of the side wall and thus more strongly heats the regions of the side wall of the preform, which are reshaped to form the longitudinal side.

According to a further development of the invention, the preform is provided by plastic injection molding in a hot state and the hot preform is heated by blowing.

According to this embodiment of the invention, the heat energy introduced by the injection molding is then used to inhomogeneously heat and further process the preform.

This makes it possible to produce the ampoule body quickly since only a part of the required heat energy has to be applied through heating the preform, in particular by means of the hot air blower. Additionally, when heating using the hot air blower, there is no need to wait until the core of the walls of the preform also has a sufficiently high temperature through heat conduction in order to reshape the core by subsequent blowing.

It is understood that the preform consists of a thermoplastic plastic, in particular of polypropylene or polyethylene or also of a compound of polypropylene and an additional material.

In particular, a matrix phase-polymer system can be provided by an additional material.

In the case of a matrix phase-polymer system, at least two different polymers are present, with one polymer being present segregated, in particular as dispersedly distributed hardened drops, in the matrix of the other polymer.

In particular, the matrix consists of a polypropylene and the phase polymer is a styrene-ethylene-butylene-styrene block copolymer (SEBS).

A softer material compared to a polypropylene in particular at temperatures below 10° C. can be provided by the phase polymer.

Preferably, the preform, still hot from the plastic injection molding process and before being heated by means of the hot air blower, has a top surface temperature and/or a core temperature of over 80° C., preferably over 90° C. and particularly preferably over 95° C. The top surface and/or core temperature is, however, preferably below 110° C.

According to one embodiment of the invention, the preform is produced as a hollow body with a base.

The preform is in particular substantially pot-shaped.

The base of the preform preferably has a lower wall thickness than an adjoining side wall. In particular, the wall thickness of the base is at least in sections 0.2 to 0.8 times, preferably 0.3 to 0.7 times the wall thickness of the side wall adjoining the base.

The thinner base is stretched less than the adjoining side wall during blowing. The thinner base of the preform allows the wall thickness of the blown ampoule body in the region of the base to approximate the wall thickness of the side wall.

The ampoule is preferably produced in such manner that the ampoule body has an average wall thickness of the base and of the side walls of between 0.2 and 0.8 mm, preferably between 0.3 and 0.6 mm.

This is an averaged wall thickness in the sense of the invention which, for example, can be determined by the wall thickness being measured at ten randomly chosen points of the ampoule body and an average valve being calculated.

The side wall is preferably formed in such manner that the wall thickness fluctuates by less than 20%, preferably by less than 10%, by the average value of the wall thickness.

According to one embodiment of the invention, a preform is produced with an averaged side wall thickness which is 2 to 10 times, preferably 3 to 5 times an averaged side wall thickness of the ampoule.

The preform is heated prior to blowing, preferably at least in sections, to a temperature of the outer top surface of 120 to 150° C., preferably of 120 to 140° C.

A hottest region of the side wall of the preform preferably has a temperature which is at least 3° C., particularly preferably at least 5° C. hotter than a coldest region of the side wall.

The hottest region of the side wall of the preform is, however, according to one embodiment of the invention, heated to a temperature which is less than 20° C., preferably less than 15° C., hotter than the coldest region of the side wall of the preform.

Consequently, even small temperature differences of preferably below 15° C. between the hottest and the coldest region of the side wall are sufficient to achieve the effect according to the invention.

According to a preferred embodiment of the invention, an ampoule is produced in which the ampoule body has a base with a central invagination.

A standing surface is spanned by the invagination.

The invagination can, in particular, merge into a standing surface via an edge.

A preform is preferably used which has a circular inner or outer cross-section.

The preform produced by plastic injection molding has, according to a preferred embodiment of the invention, a head, which is formed to attach a connector.

The head can in particular comprise a collar for clipping on the connector and/or a positive-locking element, in particular a bar or a toothing extending in the axial direction which serves as a torsion-proof connection for the connector.

The geometry of the head is preferably not changed when reshaping the preform into the ampoule body by blowing. The exact geometry possible by way of injection molding is therefore retained.

The ampoule can be filled with the medical liquid and sealed after reshaping.

In particular, the ampoule can be sealed with a connector, which comprises a septum and preferably a break-off part.

Furthermore, the ampoule sealed with the connector can be sterilized, in particular thermally sterilized, or be produced under aseptic conditions. The ampoule produced according to the invention is in particular formed in such manner that it can be autoclaved.

The injection molding of the preform, the blowing of the ampoule body and the filling and sealing and preferably also the sterilizing can, according to a preferred embodiment of the invention, be carried out in a single system.

Since only a relatively small tool is required for injection molding, the system can be formed compactly.

The invention further relates to an ampoule with a medical liquid, which is in particular produced with the method described above.

The invention is defined by an ampoule with a medical liquid, with a body of the ampoule being formed integrally and comprising a base with a standing surface and a head, with the body of the ampoule being produced from a preform expanded by means of blowing, with the head having an attached connector, with which the ampoule is sealed, with the connector comprising a septum and a break-off part and with a predetermined breaking point for the break-off part substantially aligning with an upper side of the septum.

Plastic injection molding of the preform means that an ampoule is produced in which the ampoule body has a head which is dimensionally accurate in such manner that a connector with a septum can also be attached, with the septum aligning with the predetermined breaking point of the break-off part.

If the break-off part is removed, the upper side of the remaining connecting section of the connector with the septum thus forms an area substantially merging into one another. The septum is accessible and can for example be wiped off.

The invention further relates to a system for producing an ampoule filled with a medical liquid.

In particular, the system is formed to produce the ampoule described above.

The system is preferably formed to carry out the previously described method.

The system comprises a station for injection molding a preform, an apparatus for heating the preform, with the apparatus for heating the preform being formed in such manner that a side wall of the preform is heated to varying extents over its circumference, and said system comprises a station for blowing the preform to form the ampoule.

The system according to the invention thus comprises at least two stations, namely a station for injection molding the preform and a station for blowing the preform to form the ampoule or the ampoule body.

The system further comprises an apparatus for heating the preform which is formed in such manner that the side wall of the preform is heated to varying extents over its circumference.

Since injection molding and blowing of the preform to form the ampoule are carried out in a single system, in particular in a system which comprises a transport apparatus to transport the preform first to the apparatus for heating and then to the station for blowing the preform to form the ampoule, the still hot preform can be further processed directly and the heat energy of the injection molding can be utilized to provide a base temperature for the further processing.

Since the core of the preform used is still warm in particular from the injection molding, a preform can be further processed with a relatively large side wall thickness without it having to undergo a long-lasting heating process prior to blowing. The temperature of the core is understood as the temperature in the middle of a wall of the preform, in particular a side wall.

The system preferably also has a station for filling and sealing the ampoule.

The apparatus for heating the preform is preferably formed as a hot air blower with an insert for accommodating the preform, with the insert having regions perforated to varying extents around its circumference.

In particular, the nozzle comprises an insert with a side wall, with a first region of a side wall having a perforation with a larger open area than a second region of the side wall.

In particular, the insert is perforated only in the region or the regions in which the side wall of the preform is heated more strongly in order to be subsequently reshaped by blowing to form the longitudinal side of the ampoule or of the ampoule body.

The first region can extend in particular into two perforated and opposing rows axially along the side wall of the insert.

The insert can further be formed as a sleeve with a front collar, in particular a collar which has a perforation.

A restrictor is formed by the collar, by way of which a more even pressure is produced in the gap between nozzle and insert.

In this way, a substantially even flow over the length of the insert is ensured from the openings formed by the perforation in the direction of the wall of the preform. The temperature in the gap between nozzle and insert does not decrease as a result before the front end of the nozzle.

The system according to the invention is preferably used to produce the previously described ampoule.

BRIEF DESCRIPTION OF THE DRAWINGS

The subject matter of the invention will be explained in more detail below with reference to the drawings FIG. 1 to FIG. 10 on the basis of an exemplary embodiment.

DETAILED DESCRIPTION OF THE DRAWINGS

Figure 1:
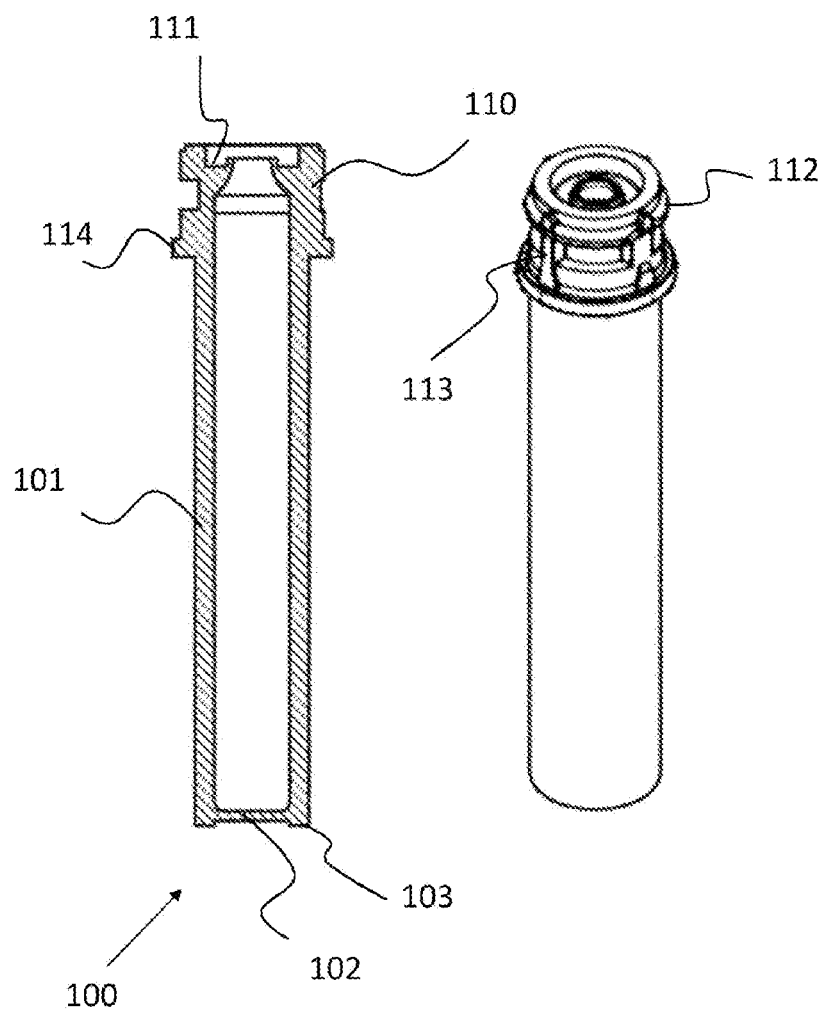
FIG. 1 is an axial sectioned view and a perspective view of an exemplary embodiment of a preform.

FIG. 1 shows, in an axial sectioned view and in a juxtaposed perspective view, an exemplary embodiment of a preform 100 made of plastic.

The preform 100 is produced by plastic injection molding and is formed substantially as a pot-shaped hollow body.

The preform 100 comprises a side wall 101 and a base 102.

The side wall 101 is thicker than the base 102.

The base 102 is also spaced from the underside of the side wall 101 such that a circumferential ring-shaped bar 103 is provided. The ring-shaped bar 103 is reshaped to form the standing surface 203 of the ampoule body 200.

Furthermore, the preform 100 comprises a head 110 which serves to attach a connector 210.

The head 110 comprises a ring groove 111 which forms a receiving region for the septum 221.

The head 110 comprises the collar 112 which serves to clip on the connector 210.

At least one bar 113 extending axially along the head 110 serves as the torsion-proof connection for the connector 210, in other words for the connecting section 211 of the connector 210.

The collar 114 present further back on the head 110 can serve as a stop for the connecting section 211 of the connector.

Figure 2:
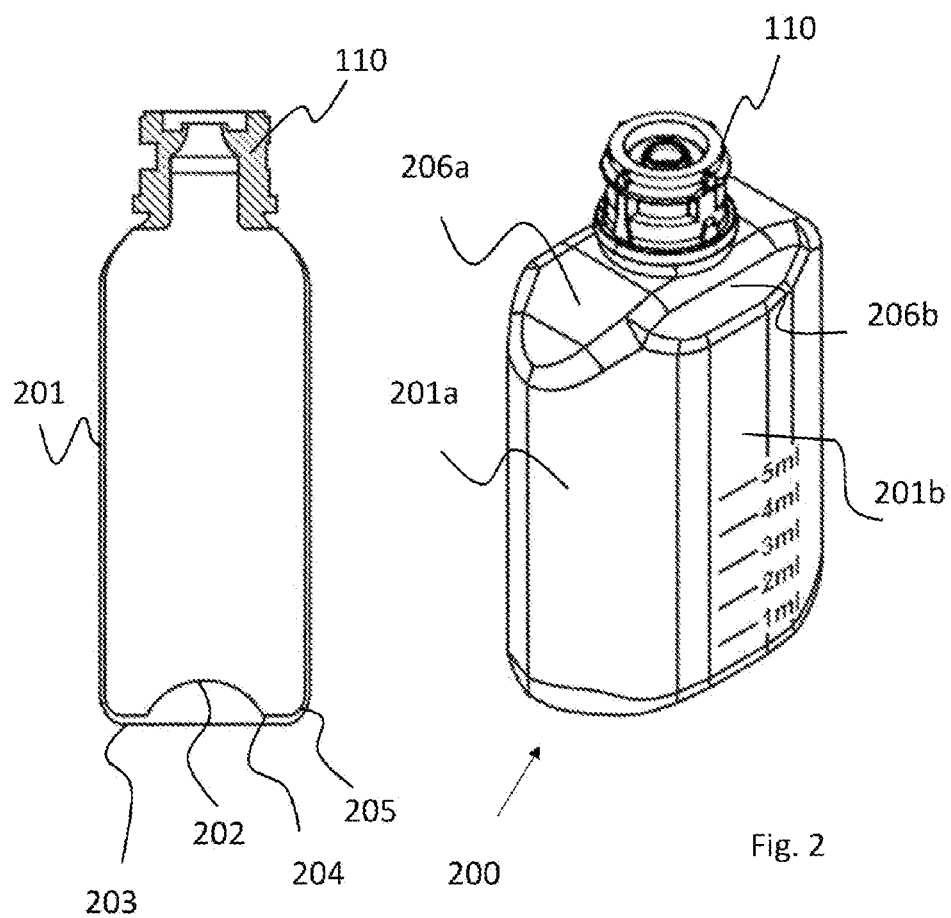
FIG. 2 also shows in an axial sectioned view and a perspective view the ampoule or the ampoule body produced from the preform, i.e. the ampoule without attached connector.

The preform 100 in FIG. 1 is further processed in the hot state after plastic injection, by it being reshaped by blowing to form the ampoule body 200 represented in FIG. 2, i.e. to form the ampoule 200 that is still not sealed with connector 210.

Prior to blowing, the side wall 101 of the preform 100 is heated inhomogeneously in such manner that the regions, which are reshaped to form the longitudinal side 201b of the side wall 201 of the ampoule body 200, are heated more strongly than the regions which are reshaped to form the narrow side 201a of the ampoule body 200.

As represented in FIG. 2, the geometry of the head 110 does not change, the head 110 of the ampoule body 200 thus corresponds in its geometry to the head 110 of the preform 100.

Otherwise, an ampoule body 200 is shaped from the circular-cylindrical preform 100 which has a substantially oval cross-section with a longitudinal side 201b and a narrow side 201a of the side wall 201. It is understood that, in the case of an oval cross-section of the ampoule body 200, longitudinal side 201b and narrow side 201a follow one another seamlessly, without it being possible to define a clear border. In the sense of the invention, it is only essential that the preform 100, prior to reshaping by blowing, is hottest in the region of its side wall 101, which lies roughly in the middle of the longitudinal side 201b after reshaping. The base of the ampoule body 200 comprises a central invagination 202 which merges into a circumferential standing surface 203 via an edge 204.

The standing surface 203 merges into the side wall 201 of the ampoule body 200 via a rounded corner 205.

In this exemplary embodiment, the shoulders 206a of the narrow side and the shoulders 206b of the longitudinal side are formed in such manner that they slope down and each merge in a rounded manner into the side wall 201 of the ampoule body 200.

Figure 3:
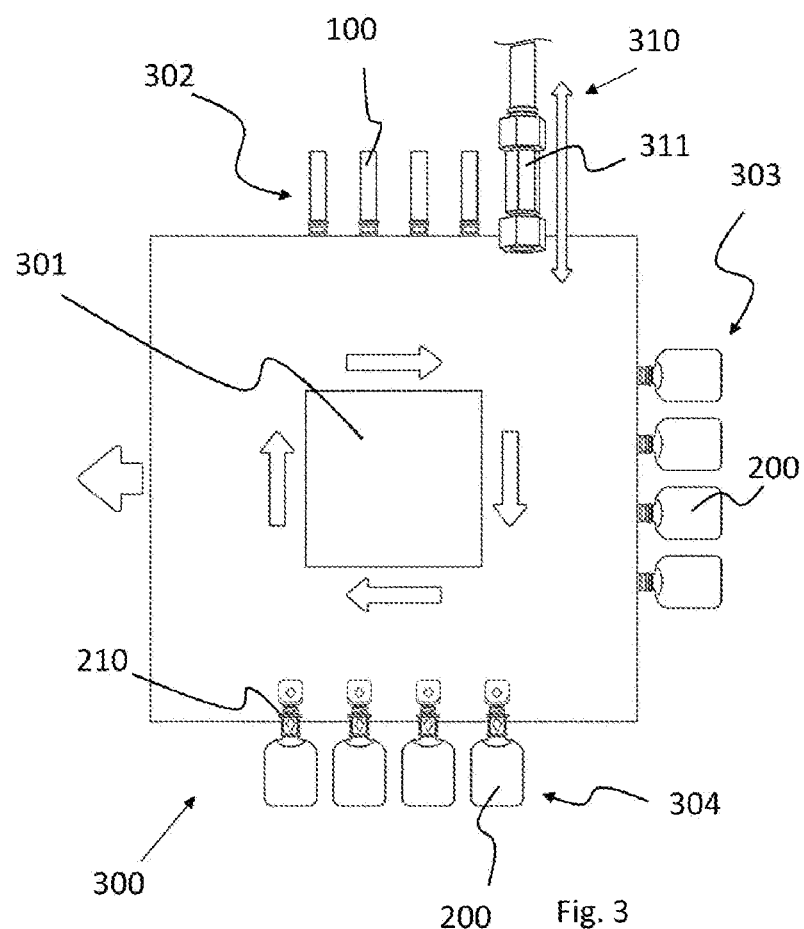
FIG. 3 is a schematic representation of an exemplary embodiment of a system for producing an ampoule filled with a medical liquid.

FIG. 3 is a schematic view of a system 300 according to the invention for producing an ampoule 200 filled with a medical liquid.

The system 300 comprises a transport apparatus 301 which is represented schematically and which moves towards the different stations of the system 300.

The first station of the system is a station 302 for injection molding the preform 100. Details of the station 302 for injection molding the preform 100 are not represented. It is understood that such a station 302 for injection molding has for example an apparatus for heating a plastic granulate and an apparatus for injecting the melted plastic into a mold. Such systems are known from the prior art.

The preform produced by means of injection molding is transported further by the transport apparatus 301 to the station 303 for blowing the ampoule body 200.

To this end, the still hot preform 100 is removed by the transport apparatus 301 from the station 302 for injection molding.

Before the still hot preform 100 is expanded to form the ampoule body 200, it is heated by means of an apparatus for heating 310 the preform 100.

The apparatus 310 for heating the preform 100 comprises a nozzle 311 from which hot air flows out.

The apparatus for heating 310 the preform can be located in the station 302 for injection molding the preform and in the station 303 for blowing the ampoule.

Likewise, according to a further embodiment, it is possible that the apparatus 310 for heating the preform 100 is located between the station 302 for injection molding and the station 303 for blowing the ampoule.

In the exemplary embodiment represented schematically here, the apparatus 310 for heating the preform 100 is arranged behind the station 302 for injection molding. The nozzle 311 can be moved relative to the preform 100 such that the preform 100 can be introduced into the nozzle 311.

The station 303 for blowing the ampoule 200 is followed by a station 304 for filling and sealing the ampoules 200 with a connector 210.

The system 300 represented here can be formed to be very compact. In particular, the system can be formed in such manner that it occupies a volume of less than 20 m³, preferably less than 5 m³.

Figure 4A:
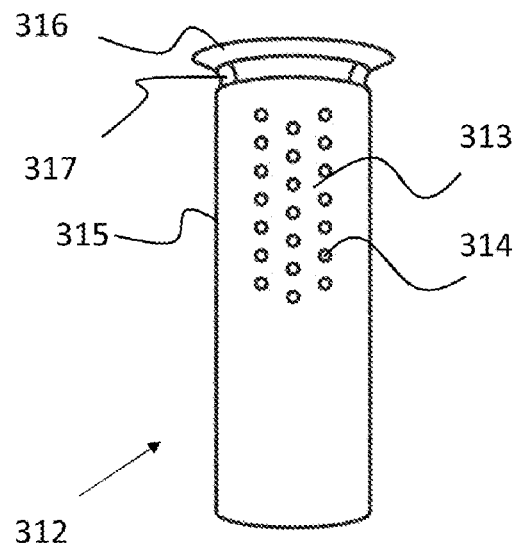
FIG. 4a and FIG. 4b are side views of an insert according to one exemplary embodiment, as is used for the nozzle to heat the preform prior to blowing.
Figure 4B:
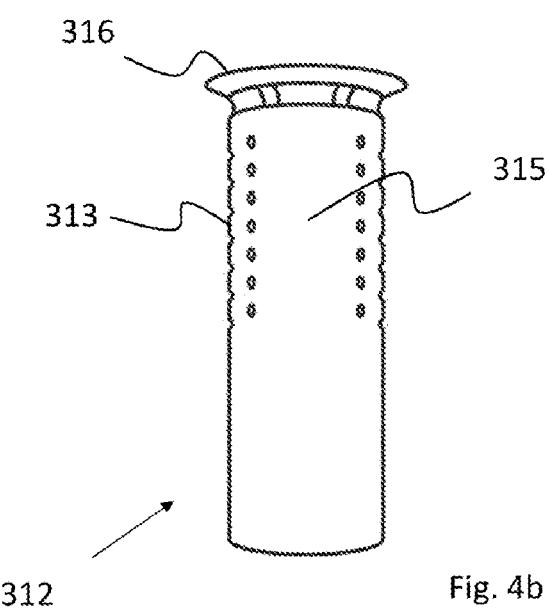

FIG. 4a and FIG. 4b are side views of an insert 312 which are used for the nozzle 311 in order to inhomogeneously heat the side wall 101 of the preform 100.

As represented in FIG. 4a, the insert 312 comprises a first region 313 which is provided with a perforation 314. In order to targetedly heat the preform on two opposing sides of the side wall 101, two first regions 313 each with one perforation 314 are located opposite one another.

In this exemplary embodiment, the perforation 314 has multiple rows in the first region 313 in each case and extends axially along the side wall of the nozzle 311.

As represented in FIG. 4b, an angularly-offset second region 315 is, in contrast, not provided with a perforation.

The nozzle comprises a collar 316 which is also provided with a perforation 317 from which hot air can leave the nozzle 311.

A gap is thus formed between the collar 316 and the inner side wall of the nozzle 311 through which hot air flows.

Hot air can flow out of the gap towards the opposing side wall 101 of the preform 100 through the perforation 314 in the first region 313.

In this way, the regions of the side wall 101 of the preform 100 opposite the perforation 314 are heated more strongly than the regions of the side wall 101 arranged at an angular offset, which are opposite the non-perforated second region 315.

Figure 5A:
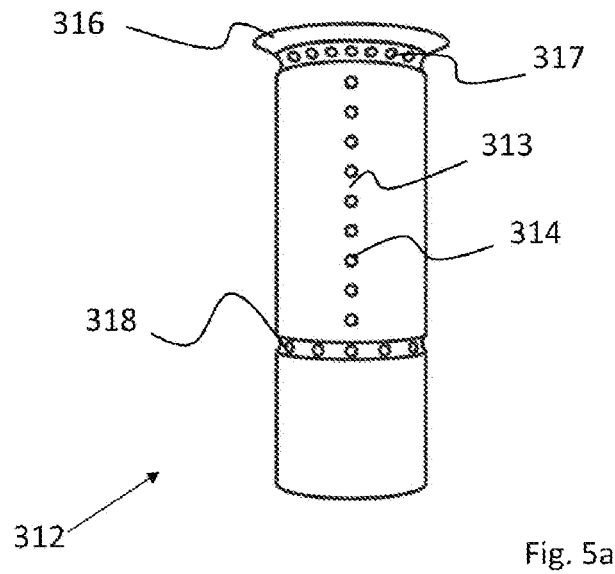
FIG. 5a and FIG. 5b are side views of an alternative exemplary embodiment of such an insert.
Figure 5B:
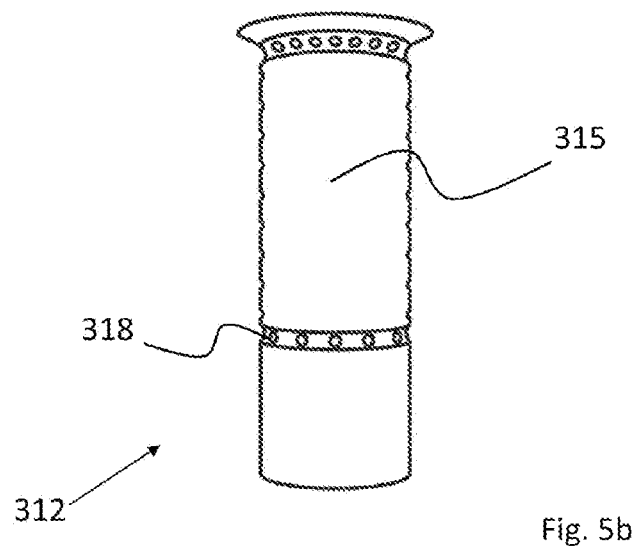

FIG. 5a and FIG. 5b show an alternative exemplary embodiment of such an insert 312.

In the case of this exemplary embodiment, a first region 313 is also provided with a perforation 314 and a second region 315 without a perforation.

The perforation 314 comprises only one row of openings in this exemplary embodiment which extend axially along the side wall of the insert 312.

The insert 312 comprises a collar 316 with perforation 317.

The insert 312 further comprises a perforation 318 extending in a ring-shaped manner around the insert on the side opposite the collar 316.

Hot air can also flow through the perforation 318 in the region of the base 102 of the preform 100 towards the preform 100. In this way, targeted heating of the base region can also be provided.

Figure 6:
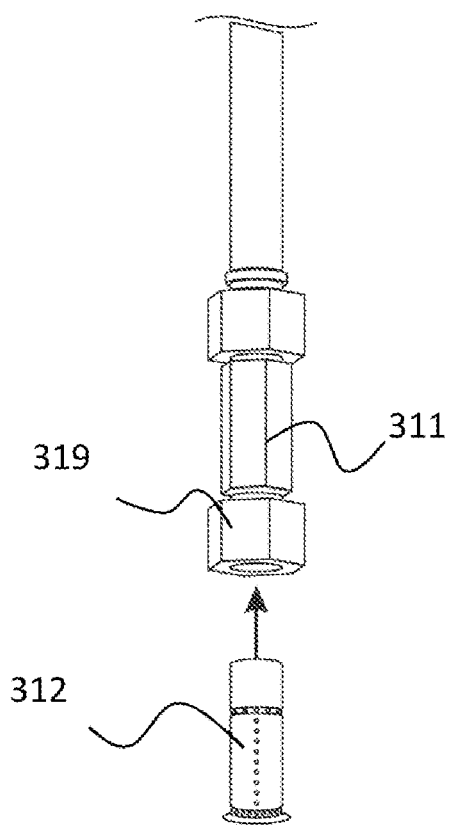
FIG. 6 shows how such an insert is attached in the nozzle.

FIG. 6 shows how such an insert 312 is inserted into the nozzle 311.

In this exemplary embodiment, the nozzle 311 comprises a union nut 319 via which the insert 312 is secured in the nozzle 311. A gap is thus located between the outer side wall of the sleeve 312 and the inner side wall of the nozzle 311 through which hot air flows.

Figure 7:
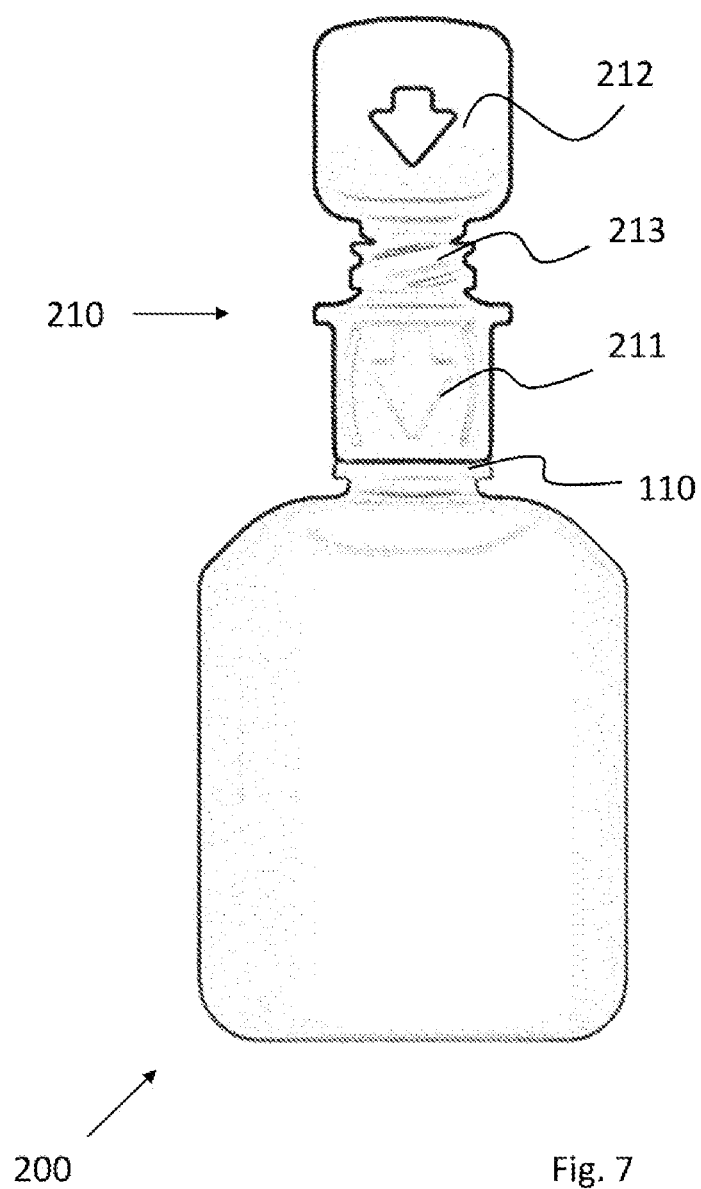
FIG. 7 shows in one view the ampoule provided with the connector.

FIG. 7 shows in one view an ampoule 200 now provided with a connector 210.

The connector 210 comprises a connecting section 211 which is clipped onto the head 110 of the ampoule 200.

The connector 210 can comprise a thread 213 such that the connector 210 is for example formed as a Luer lock connection.

The connector 210 comprises a break-off part 212 by way of which the sterile septum 221, which is located under the break-off part 212, is released.

Figure 8:
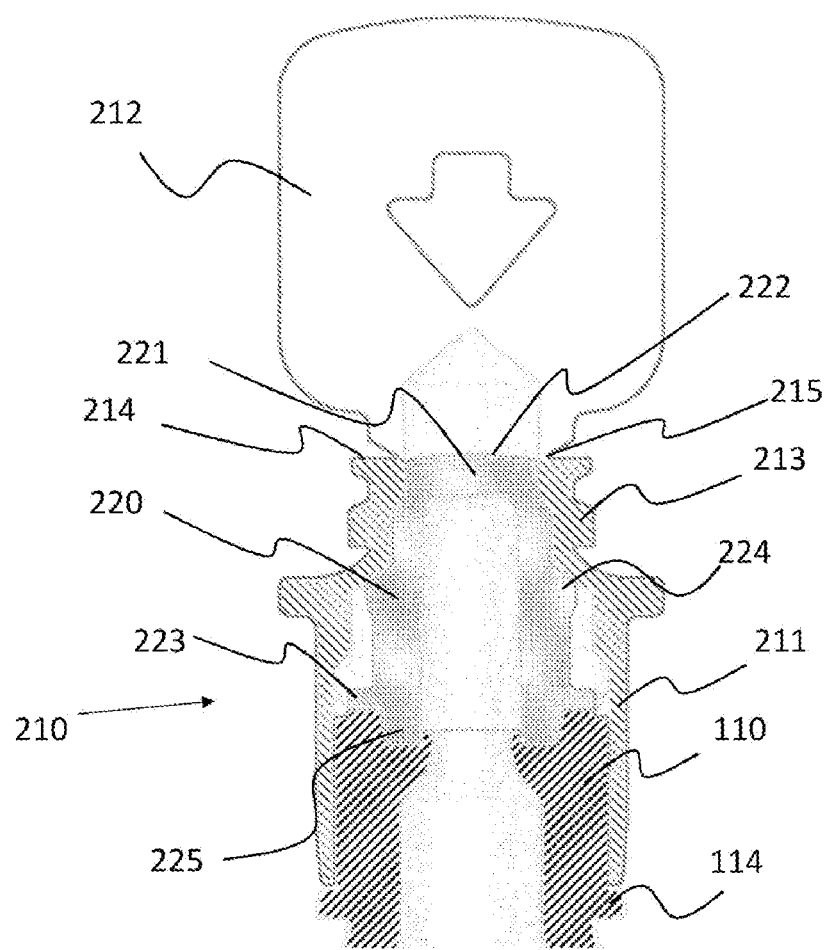
FIG. 8 is a sectioned view of the head of the ampoule and of the connector.

FIG. 8 shows in an axial sectioned view the head 110 of the ampoule 200 sealed with a connector 210.

The connector 210 comprises the connecting section 211 which is clipped onto the collar 112 of the head 110.

The connecting section 211 reaches up to the lower collar 114 of the head 110.

The connecting section 211, on the one hand, provides the thread 213 and, on the other hand, secures the substantially pot-shaped seal element 220 with the septum 221 in the intermediate space between connecting section 211 and head 110 provided by the connecting section 211.

The seal element 220 comprises a collar 223 which sits on the head 110 at the front.

A collar 224 spaced apart therefrom rests on the inner wall of the connecting section 211 tapering in this region.

The seal element 220 further comprises on the side adjoining the head 110 a front, ring-shaped, axially extending bar 225 which engages into the ring groove 111 of the head 110.

The connecting section 211 merges into the break-off part 212 via a predetermined breaking point 215, which is formed as a constricted portion.

The predetermined breaking point 215 formed as a constricted portion is roughly aligned with the upper side 222 of the septum 221.

Figure 9:
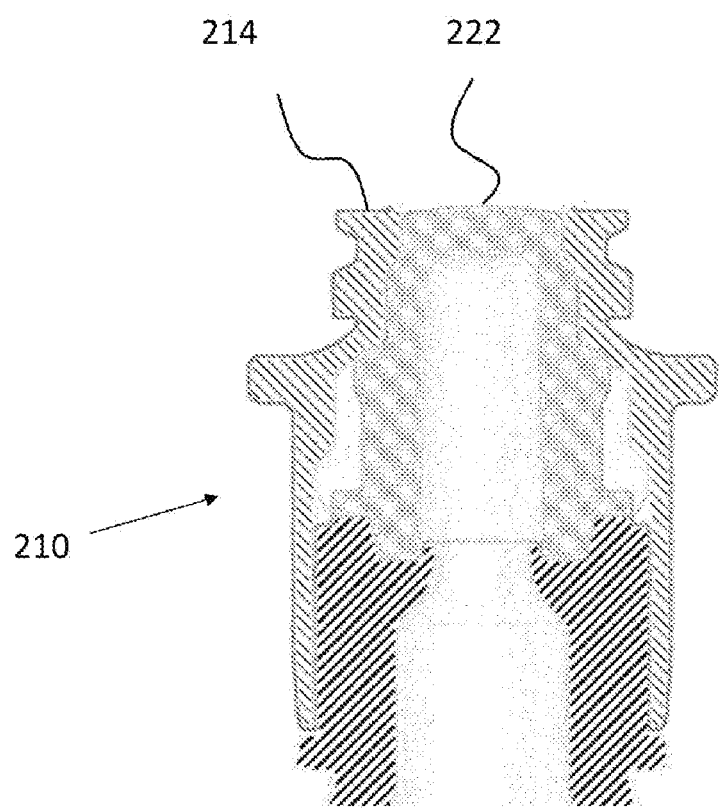
FIG. 9 shows the connector, with the break-off part now removed.

The adjoining upper side 214 of the connecting piece 211 is located at roughly the height of the septum 221 in the case of the broken break-off part 212, as represented in FIG. 9.

The septum 221 is accessible to the user and can for example be wiped off for regulatory reasons.

Figure 10:
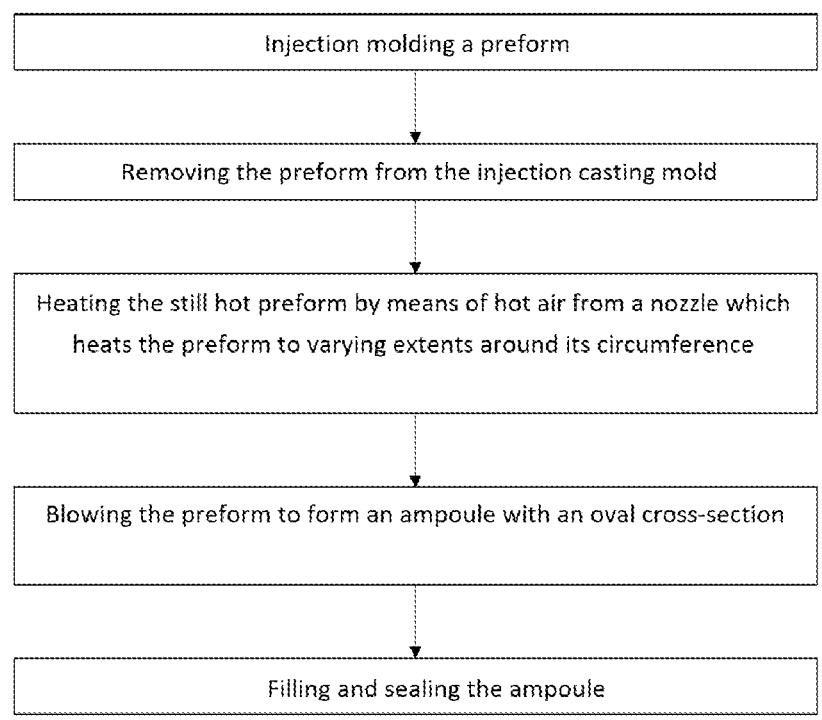
FIG. 10 is a flow diagram and shows the steps according to an exemplary embodiment of the method according to the invention.

FIG. 10 shows in a flow diagram the method steps for producing an ampoule 200 according to the invention in accordance with an exemplary embodiment of the invention.

A preform 100 is first produced by injection molding.

The preform 100 is removed from the injection casting mold preferably by means of a transport apparatus 301.

The preform 100, which is still hot from the injection molding, is heated by means of hot air from a nozzle 311 in such manner that the preform is heated to varying extents around its circumference.

The preform 100 is then blown to form an ampoule 202 with an oval cross-section. Regions of the side wall 101, which are reshaped to form the longitudinal side 201b of the ampoule 200, are heated more strongly here than the regions, which are reshaped to form the narrow side 201a.

An even wall thickness of the side wall 201 of the ampoule 200 is thus ensured.

The ampoule 200 is then filled and sealed with a connector 210.

A very efficient and quick method for producing an ampoule 200 can be provided by the invention.

An ampoule could also be provided with an integral ampoule body 200, which has a standing surface 203 and can be sealed with a connector 210, with the predetermined breaking point 215 of a break-off part 212 aligning with the upper side 222 of the septum 221.

LIST OF REFERENCE NUMERALS

100 Preform
101 Side wall
102 Base
103 Bar
110 Head
111 Ring groove
112 Collar
113 Bar
114 Collar
200 Ampoule/ampoule body
201 Side wall
201b Longitudinal side of the side wall
201a Narrow side of the side wall
202 Invagination
203 Standing surface
204 Edge
205 Rounded corner
206a Shoulder narrow side
206b Shoulder longitudinal side
210 Connector
211 Connecting section
212 Break-off part
213 Thread
214 Upper side of the connecting piece
215 Predetermined breaking point
220 Seal element
221 Septum
222 Upper side of the septum
223 Collar
224 Collar
225 Bar
300 System for producing an ampoule filled with a medical liquid
301 Transport apparatus
302 Station for injection molding the preform
303 Station for blowing the ampoule
304 Station for filling and sealing the ampoule
310 Apparatus for heating the preform
311 Nozzle
312 Insert
313 First region
314 Perforation of the first region
315 Second region
316 Collar
317 Perforation of the collar
318 Perforation
319 Union nut

The invention claimed is:

1. A method for producing an ampoule filled with a medical liquid, wherein a preform is produced by a plastic injection molding process, which is reshaped to form an ampoule by heating and blowing, which comprises a longitudinal side and a narrow side in the cross-section, wherein the preform is heated prior to reshaping by blowing in such manner that it is heated more strongly in a region of the side wall, which is reshaped to form a region of the side wall of the longitudinal side of the ampoule, than in an adjoining side wall region of the narrow side, wherein the ampoule is filled with a medical liquid after reshaping and is sealed and in that the ampoule is sealed with a connector, which comprises a septum and a break-off part and wherein a predetermined breaking point for the break-off part aligns substantially with an upper side of the septum and in that the septum is wipeable.

2. The method according to claim 1, wherein the preform is heated by introducing it into a nozzle of a hot air blower.

3. The method according to claim 2, wherein the nozzle comprises a perforated insert, wherein the perforation is formed to varying extents around the circumference of the insert.

4. The method according to claim 2, wherein an insert with a side wall is used, wherein a first region of the side wall has a perforation with a larger open area than a second region of the side wall.

5. The method according to claim 4, wherein the first region extends into two perforated and opposing rows axially along the side wall of the insert.

6. The method according to claim 2, wherein an insert with a front collar is used.

7. The method according to claim 1, wherein the preform is provided by plastic injection molding in a hot state and the hot preform is heated by blowing.

8. The method according to claim 7, wherein the hot preform has a top surface temperature and/or a core temperature of over 80° ° C., and/or of below 110° C.

9. The method according to claim 1, wherein the preform is produced as a hollow body with a base, in particular wherein the base of the preform has a smaller wall thickness than an adjoining side wall), in particular in that the wall thickness of the base is, at least in sections, 0.2 to 0.8 times the wall thickness of the side wall.

10. The method according to claim 1, wherein the ampoule has an average wall thickness of between 0.2 and 0.8 mm, and/or in that the preform is produced with an averaged side wall thickness which is 2 to 10 times an averaged side wall thickness of the ampoule.

11. The method according to claim 1, wherein the preform is heated, at least in sections, to a temperature of the outer top surface of 120 to 150° C., and/or in that a hottest region of the side wall of the preform is heated to a temperature at least 3° ° C. hotter than a coldest region of the side wall of the preform and/or in that the hottest region of the side wall of the preform is heated to a temperature at least 20° C. hotter than the coldest region of the side wall of the preform.

12. The method according to claim 1, wherein the ampoule has a base with a central invagination and/or in that the ampoule is formed oval in a cross-section and/or in that the ampoule has a base with a standing surface.

13. The method according to claim 1, wherein the preform has a circular inner and/or outer cross-section and/or in that the preform produced by the plastic injection molding has a head which is formed for attaching a connector.

14. The method according to claim 1, wherein the ampoule sealed with the connector is sterilized.

15. A method comprising using a system for producing an ampoule that is filled with a medical liquid, wherein the system comprises a station for injection molding a preform, an apparatus for heating the preform, and a station for blowing the preform to form the ampoule, wherein the apparatus for heating the preform is formed in such manner that a side wall of the preform is heated to varying extents along a circumference thereof, wherein the ampoule is filled with a medical liquid after reshaping and is sealed and in that the ampoule is sealed with a connector, which comprises a septum and a break-off part and wherein a predetermined breaking point for the break-off part aligns substantially with an upper side of the septum and in that the septum is wipeable.

* * * * *